Figure 1:
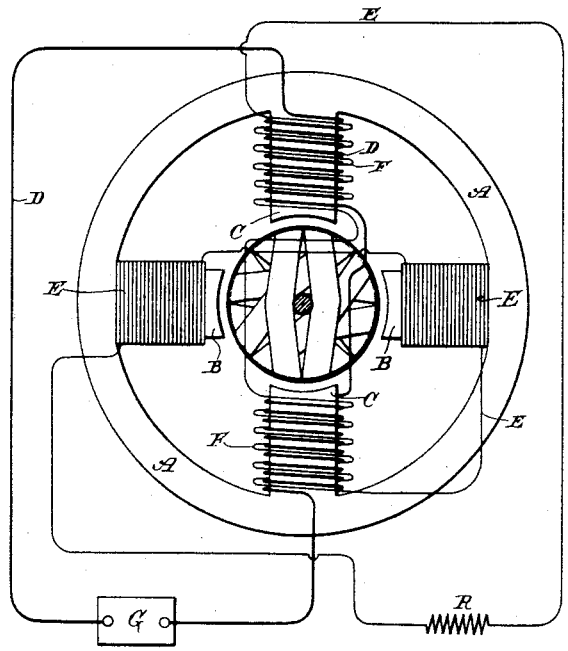

(No Model.)

N. TESLA.
ELECTRO MAGNETIC MOTOR.

No. 445,207.  Patented Jan. 27, 1891.

Witnesses:
Raphael Netter
Frank E. Hartley

Inventor
Nikola Tesla
By
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 445,207, dated January 27, 1891.

Application filed May 20, 1889. Serial No. 311,417. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in Electro-Magnetic Motors, of which the following is a specification, reference being had to the drawings accompanying and forming a part of the same.

Among the various forms of alternating-current motors invented by me is one which I have described in other applications, and which is constructed as follows: I build a field-core with, say, four poles, between which is mounted an armature that is generally wound with closed coils. On two of the opposite poles of the field I wind primary coils, which are connected up in the main circuit. On the same cores I also wind secondary coils, which are closed through coils on the other pair or set of poles. In this motor when an alternating current is caused to pass through the primary coils it energizes directly one set of poles and induces currents in the secondary coils, which act to energize the other poles; but the phases of the current in the secondary coils may differ in time from those of the primary current, and hence a rotation or shifting of the poles is effected that imparts rotation to the motor.

These motors may be constructed in many other ways; but for purposes of this case it is only necessary to consider the specific form which I have thus generally described, as my improvements relate mainly to such form.

The object of my present invention is to render this form of motor more efficient and to improve its action or mode of operation.

In the motors constructed in accordance with this principle I bring two energizing-circuits into inductive relation in the motor itself—that is to say, the secondary currents which energize one set of the field-cores are induced in the motor itself, and the employment of an external induction device is thus avoided. The operation of these motors, however, is dependent upon the existence of a certain difference of phase between the currents in the primary and secondary coils. To obtain a difference of phase or lag that is suited to working conditions is the specific object of my present invention.

The following explanations will serve to illustrate the principle upon which said invention is based. Let it be assumed that an ordinary alternating-current generator is connected up in a circuit of practically no self-induction, such, for example, as a circuit containing incandescent lamps only. On the operation of the machine alternating currents will be developed in the circuit, and the phases of these currents will theoretically coincide with the phases of the impressed electro-motive force. Such currents may be regarded and designated as the "unretarded currents."

It will be understood, of course, that in practice there is always more or less self-induction in the circuit, which modifies to a corresponding extent these conditions; but for convenience this may be disregarded in the consideration of the principle of operation, since the same laws apply. Assume next that a path of currents be formed across any two points of the above circuit, consisting, for example, of the primary of an induction device. The phases of the currents passing through the primary, owing to the self-induction of the same, will not coincide with the phases of the impressed electro-motive force, but will lag behind the same, such lag being directly proportional to the self-induction and inversely proportional to the resistance of the said coil. The insertion of this coil will also cause a lagging or retardation of the currents traversing and delivered by the generator behind the impressed electro-motive force, such lag being the mean or resultant of the lag of the current through the primary alone and that of what I have designated the "unretarded current" in the entire working-circuit. Next consider the conditions imposed by the association in inductive relation with the primary coil of a secondary coil. The current generated in the secondary coil will react upon the primary current, modifying the retardation of the same, according to the amount of self-induction and resistance in the secondary circuit. If the secondary circuit have but little self-induction—as, for instance, when it contains incandescent lamps only—it will increase the actual difference of phase between its own and the primary current, first, by diminishing the lag between the primary current and the impressed electro-motive force, and, second, by its own lag or retardation behind the impressed electro-motive force. On the other hand, if the secondary circuit have a high self-induction its lag behind the current in the primary is directly increased, while it will be still further increased if the primary have a very low self-induction. The better results are obtained when the primary has a low self-induction. I apply these principles to the construction of a motor which I shall now describe.

The details of the improvements are illustrated in the drawings, in which—

Figure 2:
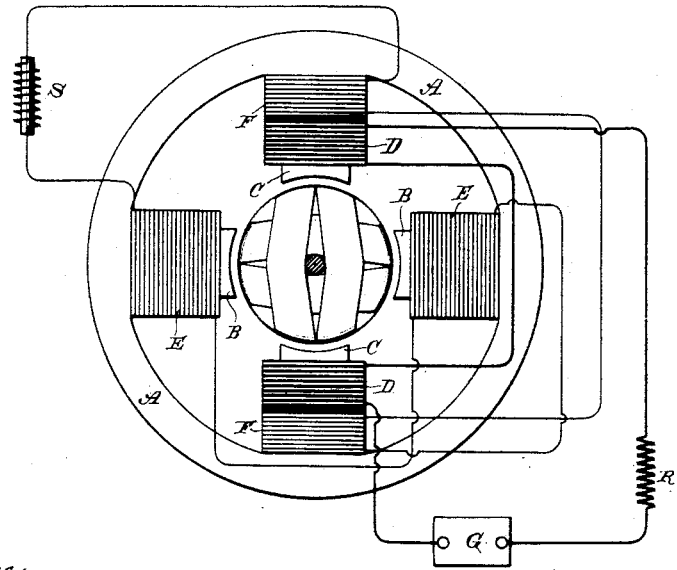

Figure 1 is a diagram of a motor exhibiting my invention. Fig. 2 is a similar diagram of a modification of the same.

In Fig. 1 let A designate the field-magnet of a motor which, as in all these motors, is built up of sections or plates. B C are polar projections upon which the coils are wound. Upon one pair of these poles, as C, I wind primary coils D, which are directly connected to the circuit of an alternating-current generator G. On the same poles I also wind secondary coils F, either side by side or over or under the primary coils, and these I connect with other coils E, which surround the poles B B. The currents in both primary and secondary coils in such a motor will be retarded or will lag behind the impressed electro-motive force; but to secure a proper difference in phase between the primary and secondary currents themselves I increase the resistance of the circuit of the secondary and reduce as much as practicable its self-induction. I do this by using for the secondary circuit, particularly in the coils E, wire of comparatively small diameter and having but few turns around the cores; or I use some conductor of higher specific resistance, such as German silver; or I may introduce at some point in the secondary circuit an artificial resistance R. Thus the self-induction of the secondary is kept down and its resistance increased with the result of decreasing the lag between the impressed electro-motive force and the current in the primary coils and increasing the difference of phase between the primary and secondary currents.

In the disposition shown in Fig. 2 the lag in the secondary is increased by increasing the self-induction of that circuit, while the increased tendency of the primary to lag is counteracted by inserting therein a dead resistance. The primary coils D in this case have a low self-induction and high resistance, while the coils E F, included in the secondary circuit, have a high self-induction and low resistance. This may be done by the proper winding of the coils, or in the circuit including the secondary coils E F, I may introduce a self-induction coil S, while in the primary circuit from the generator G and including coils D, I may insert a dead resistance R. By this means the difference of phase between the primary and secondary is increased. It is evident that both means of increasing the difference of phase—namely, by the special winding as well as by the supplemental or external inductive and dead resistance—may be employed conjointly.

In the operation of this motor the current impulses in the primary coils induce currents in the secondary coils, and by the conjoint action of the two the points of greatest magnetic attraction are shifted or rotated.

In practice I have found it desirable to wind the armature with closed coils in which currents are induced by the action thereon of the primaries.

I do not claim, broadly, herein the method of operating motors by inducing in one circuit currents by means of those in another, nor the other features herein not specifically pointed out in the claims, having personally filed applications for such features.

What I claim is—

1. The combination, in a motor, of a primary energizing-circuit adapted to be connected with the circuit of a generator and a secondary energizing-circuit in inductive relation thereto, the two circuits being of different electrical character or resistance, as set forth.

2. The combination, in a motor, of a primary energizing-circuit adapted to be connected with the circuit of a generator and a secondary energizing-circuit in inductive relation thereto, the two circuits being of different self-induction, as herein set forth.

3. The combination, in a motor, of primary energizing-coils adapted to be connected to a source of current and secondary energizing-coils in a circuit in inductive relation thereto, one set of said coils being formed by conductors of small size and few turns, the other by conductors of larger size, as set forth.

NIKOLA TESLA.

Witnesses:
R. J. STONEY, Jr.,
E. P. COFFIN.